United States Patent
Cookson et al.

(10) Patent No.: US 10,858,489 B2
(45) Date of Patent: *Dec. 8, 2020

(54) SEMI-FLEXIBLE FOAM FORMULATIONS

(71) Applicant: Dow Global Technologies LLC, Midland, MI (US)

(72) Inventors: Paul Cookson, Horgen (CH); Irena Amici-Kroutilova, Horgen (CH); Francois M. Casati, Horgen (CH); Hamideh Ahmadloo, Horgen (CH); Alberto Lora Lamia, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/563,070

(22) PCT Filed: Mar. 30, 2016

(86) PCT No.: PCT/US2016/024941
§ 371 (c)(1),
(2) Date: Sep. 29, 2017

(87) PCT Pub. No.: WO2016/160939
PCT Pub. Date: Oct. 6, 2016

(65) Prior Publication Data
US 2018/0086888 A1    Mar. 29, 2018

Related U.S. Application Data

(60) Provisional application No. 62/140,703, filed on Mar. 31, 2015.

(51) Int. Cl.
| | | |
|---|---|---|
| *C08J 9/00* | (2006.01) | |
| *C08G 18/48* | (2006.01) | |
| *C08G 18/76* | (2006.01) | |
| *C08G 18/18* | (2006.01) | |
| *C08G 18/24* | (2006.01) | |
| *C08G 18/20* | (2006.01) | |
| *C08J 9/12* | (2006.01) | |
| C08G 101/00 | (2006.01) | |

(52) U.S. Cl.
CPC ........ *C08J 9/0061* (2013.01); *C08G 18/1833* (2013.01); *C08G 18/2027* (2013.01); *C08G 18/2063* (2013.01); *C08G 18/244* (2013.01); *C08G 18/485* (2013.01); *C08G 18/4816* (2013.01); *C08G 18/4829* (2013.01); *C08G 18/4841* (2013.01); *C08G 18/7621* (2013.01); *C08J 9/125* (2013.01); *C08G 2101/005* (2013.01); *C08G 2101/0016* (2013.01); *C08G 2101/0083* (2013.01); *C08J 2203/10* (2013.01); *C08J 2205/08* (2013.01); *C08J 2375/08* (2013.01)

(58) Field of Classification Search
CPC ............ C08G 18/1833; C08G 18/2027; C08G 18/2063; C08G 18/244; C08G 18/4816; C08G 18/4829; C08G 18/4841; C08G 18/485; C08G 18/7621; C08G 2101/0016; C08G 2101/005; C08G 2101/0083; C08J 9/0061; C08J 9/125; C08J 2203/10; C08J 2205/08; C08J 2375/08
See application file for complete search history.

(56) References Cited

U.S. PATENT DOCUMENTS

| | | | |
|---|---|---|---|
| 6,410,609 B1 | 6/2002 | Taylor et al. | |
| 9,029,432 B2 | 5/2015 | Auo et al. | |
| 9,376,526 B2 | 6/2016 | Hager et al. | |
| 9,751,284 B2 | 9/2017 | Savalca et al. | |
| 2007/0282029 A1 | 12/2007 | Hager et al. | |
| 2013/0079429 A1* | 3/2013 | Hager | C08L 75/08 521/123 |
| 2013/0209778 A1 | 8/2013 | Albach et al. | |
| 2013/0289150 A1 | 10/2013 | Hager et al. | |
| 2016/0016387 A1 | 1/2016 | Cavalca et al. | |

FOREIGN PATENT DOCUMENTS

WO   WO-2012050671 A1 *  4/2012  ......... C08G 18/7664

OTHER PUBLICATIONS

International Search Report & Written Opinion for related PCT Application PCT/US2016/024941, dated Jun. 9, 2016 (10 pgs).
International Preliminary Report on Patentability for related PCT Application PCT/US2016/024941, dated Oct. 12, 2017 (7pgs).

* cited by examiner

Primary Examiner — John M Cooney
(74) Attorney, Agent, or Firm — Brooks, Cameron & Huebsch, PLLC

(57) ABSTRACT

Embodiments of the present disclosure are directed towards semi-flexible foam formulations that can be utilized to form semi-flexible foams. As an example, a semiflexible foam formulation can include a first polyether polyol having an average nominal hydroxyl functionality from 2 to 4 and a number average equivalent weight from 120 to 1500, a second polyether polyol having a having an average nominal hydroxyl functionality from 4 to 8 and a number average equivalent weight from 120 to 800, and a third polyether polyol having an average nominal hydroxyl functionality from 2 to 4 a number average equivalent weight from 200 to 500 and toluene diisocyanate.

9 Claims, No Drawings

SEMI-FLEXIBLE FOAM FORMULATIONS

This application is a National Stage Application under 35 U.S.C. § 371 of International Application Number PCT/US2016/024941, filed Mar. 30, 2016 and published as WO 2016/160939 Oct. 6, 2016, which claims the benefit to U.S. Provisional Application 62/140,703, filed Mar. 31, 2015, the entire contents of which are incorporated herein by reference in its entirety.

FIELD OF DISCLOSURE

Embodiments of the present disclosure are directed towards semi-flexible foam formulations, more specifically, embodiments are directed towards semi-flexible foam formulations including toluene diisocyanate.

BACKGROUND

Foams are dispersions in which a gas is dispersed in a liquid material, a solid material, or a gel material. Foams can be formed by a chemical reaction of polyols and isocyanate. Foams can be utilized for a number of various applications, including bedding, furniture, vehicle seating, and carpet backing, among others.

SUMMARY

The present disclosure provides semi-flexible foam formulations including a polyether polyol composition including a first polyether polyol having an average nominal hydroxyl functionality from 2 to 4 and a number average equivalent weight from 120 to 1500, wherein the first polyether polyol includes polymer chain having from 0 weight percent to 15 weight percent of constitutional units derived from ethylene oxide and 85 weight percent to 100 weight percent of constitutional units derived from propylene oxide, a second polyether polyol having a having an average nominal hydroxyl functionality from 4 to 8 and a number average equivalent weight from 120 to 800, wherein the second polyether polyol includes a polypropylene oxide polymer chain, and a third polyether polyol having an average nominal hydroxyl functionality from 2 to 4 a number average equivalent weight from 200 to 500, wherein the third polyether polyol includes a polymer chain having from 40 weight percent to 85 weight percent of constitutional units derived from ethylene oxide and 15 weight percent to 60 weight percent of constitutional units derived from propylene oxide, where the polyether polyol composition is from 20 weight percent to 50 weight percent of constitutional units derived from ethylene oxide, the polyether polyol composition has a total average nominal hydroxyl functionality from 3.05 to 4.1, and the polyether polyol composition has a total number average equivalent weight from 250 to 400 and toluene diisocyanate.

The present disclosure provides semi-flexible foams formed by curing the semi-flexible foam formulations.

The present disclosure provides methods of forming a semi-flexible foam.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Semi-flexible foam formulations including a polyether polyol compositions and toluene diisocyanate, and semi-flexible foams formed therefrom are disclosed herein. The semi-flexible foam formulations can be cured to form semi-flexible foams, which may be referred to as polyurethanes. Polyurethanes are polymers including chains of units joined by carbamate links, which may be referred to as urethane links.

As mentioned the semi-flexible foam formulations disclosed herein may be utilized to form semi-flexible foams. These semi-flexible foams can have properties that are desirable for various applications. For example and in contrast to previous semi-flexible foams, the semi-flexible foams disclosed herein have a number of viscoelastic properties. For instance, the semi-flexible foams disclosed herein can have a density between 35 and 80 kg/m$^3$, a resiliency from 2 percent to 20 percent, a 95% recovery time of at least 3 seconds, and/or a compression load deflection at 40% of at least 1.3 kPa as measured according to ISO 3386. Surprisingly and in contrast to previous foam formulations, the semi-flexible foam formulations disclosed herein can be utilized to provide semi-flexible foams having the density, resiliency, recovery time, and compression load deflection mentioned, while simultaneously providing a number of other desirable properties.

The semi-flexible foam formulations disclosed herein include a polyether polyol composition. As used herein, "polyol" refers to an organic molecule, e.g., polyether, having an average of greater than 1.0 hydroxyl groups per molecule.

The polyether polyol compositions include a first polyether polyol. The first polyether polyol can include one or more polyols, e.g., the first polyether polyol may be a blend of polyols. The first polyether polyol can have an average nominal hydroxyl functionality from 2 to 4. As used herein, "average nominal hydroxyl functionality" refers to a number average functionality, e.g., a number of hydroxyl groups per molecule, of a polyol or a polyol composition based upon a number average functionality, e.g., a number of active hydrogen atoms per molecule, of initiator(s) used for preparation. As used herein, "average" refers to number average unless indicated otherwise.

The first polyether polyol can have a number average equivalent weight from 120 to 1500. All individual values and subranges from 120 to 1500 are included; for example, the first polyether polyol can have a number average equivalent weight from a lower limit of 120, 130, or 140 to an upper limit of 1500, 1450, or 1400. Some embodiments of the present disclosure provide that the first polyether polyol is nominally a triol.

Embodiments of the present disclosure provide that the first polyether polyol includes a polymer chain having from 0 weight percent to 15 weight percent of constitutional units derived from ethylene oxide and 85 weight percent to 100 weight percent of constitutional units derived from propylene oxide. All individual values and subranges from 0 weight percent to 15 weight percent of constitutional units derived from ethylene oxide are included; for example, the first polyether polyol can include a polymer having from a lower limit of 0 weight percent, 3 weight percent, or 5 weight percent to an upper limit of 15 weight percent, 12 weight percent, or 10 weight percent of constitutional units derived from ethylene oxide. Correspondently, all individual values and subranges from 85 weight percent to 100 weight percent of constitutional units derived from propylene oxide are included; for example, the first polyether polyol can include a polymer chain having from a lower limit of 85 weight percent, 87 weight percent, or 90 weight percent to an upper limit of 100 weight percent, 97 weight percent, or 95 weight percent of constitutional units derived from propylene oxide.

The polyether polyol compositions include a second polyether polyol. The second polyether polyol can include one or more polyols, e.g., the second polyether polyol may be a blend of polyols. The second polyether polyol can have an average nominal hydroxyl functionality from 4 to 8. Some embodiments of the present disclosure provide that the nominal functionality of the second polyether polyol is 4.7. The second polyether polyol can have a number average equivalent weight from 120 to 800. All individual values and subranges from 120 to 800 are included; for example, the second polyether polyol can have number average equivalent weight from a lower limit of 120, 135, or 150 to an upper limit of 800, 750, or 700. The second polyether polyol can include a polypropylene oxide polymer chain.

The polyether polyol compositions include a third polyether polyol. The third polyether polyol can include one or more polyols, e.g., the third polyether polyol may be a blend of polyols. The third polyether polyol can have an average nominal hydroxyl functionality from 2 to 4. The third polyether polyol can have number average equivalent weight from 200 to 500. All individual values and subranges from 200 to 500 are included; for example, the third polyether polyol can have a number average equivalent weight from a lower limit of 200, 220, or 250 to an upper limit of 500, 470, or 450. Some embodiments of the present disclosure provide that the third polyether polyol is nominally a triol.

Embodiments of the present disclosure provide that the third polyether polyol includes a polymer chain having from 30 weight percent to 85 weight percent of constitutional units derived from ethylene oxide and 15 weight percent to 70 weight percent of constitutional units derived from propylene oxide. All individual values and subranges from 30 weight percent to 85 weight percent of constitutional units derived from ethylene oxide are included; for example, the third polyether polyol can include a polymer chain having from a lower limit of 30 weight percent, 35 weight percent, or 40 weight percent to an upper limit of 85 weight percent, 83 weight percent, or 80 weight percent of constitutional units derived from ethylene oxide. Correspondently, all individual values and subranges from 15 weight percent to 70 weight percent of constitutional units derived from propylene oxide are included; for example, the third polyether polyol can include a polymer chain having from a lower limit of 15 weight percent, 17 weight percent, or 20 weight percent to an upper limit of 70 weight percent, 65 weight percent, or 60 weight percent of constitutional units derived from propylene oxide.

Some embodiments of the present disclosure provide that the polyether polyol composition is based on a blend of polyols having different functionalities. For example, as previously mentioned, the first polyether polyol and the third polyether polyol may nominally be triols, while the nominal functionality of the second polyether polyol may be 4.7.

Some embodiments of the present disclosure provide that one or more of the polyether polyols is a mixed feed ethylene oxide and propylene oxide based polyol. For instance, one or more of the polyether polyols may contain polymer chains of ethylene oxide and propylene oxide combined.

The first polyether polyol, the second polyether polyol, and the third polyether polyol can be prepared using known methods. For instance, the polyether polyols can be prepared via base-catalyzed oxyalkylation. For base-catalyzed oxyalkylation, a hydric low molecular weight starter molecule, such as propylene glycol, glycerine, or sorbitol can be reacted with one or more alkylene oxides; such as ethylene oxide or propylene oxide, to form a polyether polyol, e.g., first polyether polyol, the second polyether polyol, the third polyether polyol. Another manufacturing method can utilize DMC catalysis. Among the processes that may be utilized to prepare the first polyether polyol, the second polyether polyol, and the third polyether polyol, are those discussed in U.S. Pat. Nos. 3,728,308; 5,158,922; 5,470,813; 5,689,012; 6,077,978; and 7,919,575, among others. The first polyether polyol, the second polyether polyol, and the third polyether polyol, may be obtained commercially, such as under the trade names VORANOL™, TERCAROL™, VORALUX™, and SPECFLEX™, available from The Dow Chemical Company, among others.

Embodiments of the present disclosure provide that the polyether polyol compositions can have an average nominal hydroxyl functionality from 3.05 to 4.1. For instance, polyether polyols, which form a polyether polyol composition, can have a combined nominal hydroxyl functionality from 3.05 to 4.1.

Embodiments of the present disclosure provide that the polyether polyol compositions can have a total number average equivalent weight from 250 to 400. For instance, the polyether polyols, which form a polyether polyol composition, can have a combined number average equivalent weight from 250 to 400. All individual values and subranges from 250 to 400 are included; for example, the polyether polyol compositions can have a total number average equivalent weight from a lower limit of 250, 255, or 260 to an upper limit of 400, 380, or 360.

Embodiments of the present disclosure provide that the polyether polyol compositions can be from 20 weight percent to 50 weight percent of constitutional units derived from ethylene oxide. For instance, the polyether polyols, which form a polyether polyol composition, can have constitutional units derived from ethylene oxide that sum to from 20 weight percent to 50 weight percent of a total weight of the polyether polyol composition. All individual values and subranges from 20 weight percent to 50 weight percent of constitutional units derived from ethylene oxide are included; for example, the polyether polyol compositions can be from a lower limit of 20 weight percent, 23 weight percent, or 25 weight percent to an upper limit of 50 weight percent, 47 weight percent, or 45 weight percent of constitutional units derived from ethylene oxide. Embodiments of the present disclosure provide that the polyether polyol compositions can be from 50 weight percent to 80 weight percent of constitutional units derived from propylene oxide. All individual values and subranges from 50 weight percent to 80 weight percent of constitutional units derived from propylene oxide are included; for example, the polyether polyol compositions can be from a lower limit of 50 weight percent, 53 weight percent, or 55 weight percent to an upper limit of 80 weight percent, 77 weight percent, or 75 weight percent of constitutional units derived from propylene oxide.

The polyether polyol compositions are formed from polyols, e.g., the first polyether polyol, the second polyether polyol, and the third polyether polyol. For instance, the first polyether polyol, the second polyether polyol, and the third polyether polyol can be blended with one another. Blending can be done prior to foaming or can be carried out on line, for instance through a static mixer.

Embodiments of the present disclosure provide that the first polyether polyol can be from 10 parts to 60 parts per 100 parts of a combination of the first polyether polyol, the second polyether polyol, and the third polyether polyol. All individual values and subranges from 10 parts to 60 parts are included; for example, the first polyether polyol can be from a lower limit of 10 parts, 12 parts, or 15 parts to an upper limit of 60 parts, 57 parts, or 55 parts per 100 parts of the combination of the first, the second, and the third polyether polyols.

Embodiments of the present disclosure provide that the second polyether polyol can be from 3 parts to 40 parts per 100 parts of the combination of first, the second, and the third polyether polyols. All individual values and subranges from 3 parts to 40 parts are included; for example, the second polyether polyol can be from a lower limit of 3 parts, 5 parts, or 7 parts to an upper limit of 40 parts, 37 parts, or 35 parts per 100 parts of the combination of the first, the second, and the third polyether polyols.

Embodiments of the present disclosure provide that the third polyether polyol can be from 30 parts to 70 parts per 100 parts of the combination of first, the second, and the third polyether polyols. All individual values and subranges from 30 parts to 70 parts are included; for example, the third polyether polyol can be from a lower limit of 30 parts, 33 parts, or 35 parts to an upper limit of 70 parts, 67 parts, or 65 parts per 100 parts of the combination of the first, the second, and the third polyether polyols.

Some embodiments of the present disclosure provide that one or more of the polyether polyols of polyether polyol compositions can include a SAN or styrene and acrylonitrile polymer, or PHD or polyurea polymer, for instance. Such polymer polyols may be useful to open foam cells and/or to increase foam load bearing.

As mentioned, the polyether polyol compositions are included in the semi-flexible foam formulations disclosed herein, e.g. foam formulations that can be cured to semi-flexible foams having a number of viscoelastic properties. The semi-flexible foam formulations, as disclosed herein, include toluene diisocyanate. As used herein, toluene diisocyanate includes toluene diisocyanate isomers and combinations thereof. Some embodiments of the present disclosure provide that higher functionality MDI is not utilized.

The toluene diisocyanate can be prepared by phosgenation of corresponding polyamines with formation of polycarbamoyl chlorides and thermolysis thereof to provide a polyisocyanate and hydrogen chloride, or by a phosgene-free process, such as by reacting the corresponding polyamines with urea and alcohol to give polycarbamates, and thermolysis thereof to give a polyisocyanate and alcohol, for example. Toluene diisocyanate may be obtained commercially. Examples of commercially available toluene diisocyanate include, but are not limited to, isocyanates sold under the trade names VORANATE™, available from The Dow Chemical Company.

The toluene diisocyanate can be utilized such that the semi-flexible foam formulation has an isocyanate index in a range from 70 to 115. Isocyanate index can be defined as a quotient, multiplied by one hundred, of an actual amount of isocyanate utilized and a theoretical amount of isocyanate for curing. All individual values and subranges from 70 to 115 are included; for example, the semi-flexible foam formulation can have an isocyanate index from a lower limit of 70, 75, or 80 to an upper limit of 115, 105, or 100.

The semi-flexible foam formulations can include a blowing agent. The blowing agent can be a physical blowing agent, a chemical blowing agent, or combinations thereof.

Physical blowing agents can be utilized to help foam the semi-flexible foam formulations. Examples of physical blowing agents include liquid carbon dioxide; alkanes; cycloalkanes, such as, cyclopentane, cyclohexane, cyclobutane and mixtures thereof; other cycloalkanes having a maximum of 4 carbon atoms; dialkyl ethers, cycloalkylene ethers, fluoroalkanes, and mixtures thereof. Examples of alkanes include propane, n-butane, isobutane, isopentane and mixtures thereof. Examples of dialkyl ethers include dimethyl ether, methyl ethyl ether, methyl butyl ether, diethyl ether, and combinations thereof. An example of a cycloalkylene ether is furan. Examples of fluoroalkanes include trifluoromethane, difluoromethane, difluoroethane, tetrafluoroethane, hepta-fluoropropane, and combinations thereof.

Some embodiments of the present disclosure provide that the physical blowing agent, when utilized, can be from 0.5 parts to 15.0 parts per 100 parts of a combination of the first polyether polyol, the second polyether polyol, and the third polyether polyol. All individual values and subranges from 0.5 parts to 10.0 parts are included; for example, the physical blowing agent can be from a lower limit of 0.5, 1.0, or 2.0 parts to an upper limit of 15.0, 13.0, or 10.0 parts of a combination of the first polyether polyol, the second polyether polyol, and the third polyether polyol.

Chemical blowing agents can be utilized to form carbon dioxide from a reaction with the polyisocyanate, for instance. An example the chemical blowing agent is water. Some embodiments of the present disclosure provide that the chemical blowing agent, when utilized, is from 0.5 parts to 5.0 parts per 100 parts of a combination of the first polyether polyol, the second polyether polyol, and the third polyether polyol. All individual values and subranges from 0.5 parts to 5.0 parts are included; for example, the chemical blowing agent can be from a lower limit of 0.5, 0.6, or 0.7 parts to an upper limit of 5.0, 4.8, or 4.6 parts per 100 parts of a combination of the first polyether polyol, the second polyether polyol, and the third polyether polyol. Some embodiments of the present disclosure provide that carbon dioxide may also be utilized via adducts of carbon dioxide, such as carbamates, which may be added to the viscoelastic foam formulations.

The semi-flexible foam formulations can include a surfactant. The surfactant may help to emulsify components of the viscoelastic foam formulation, regulate cell size of a resultant foam, and/or stabilize a cell structure to help prevent collapse and/or sub-surface voids. Examples of surfactants include silicon-based compounds such as silicone oils and organosilicone-polyether copolymers, such as polydimethyl siloxane and polydimethylsiloxane-polyoxyalkylene block copolymers, e.g., polyether modified polydimethyl siloxane, and combinations thereof. Examples of surfactants include silica particles and silica aerogel powders, as well as organic surfactants such as nonylphenol ethoxylates. Surfactants are available commercially and include those available under trade names such as NIAX™, DABCO™, and TEGOSTAB™, among others. Some embodiments of the present disclosure provide that surfactant, when utilized, is from 0.1 parts to 1.5 parts per 100 parts of a combination of the first polyether polyol, the second polyether polyol, and the third polyether polyol. All individual values and subranges from 0.1 parts to 1.5 parts are included; for example, the surfactant can be from a lower limit of 0.1, 0.2, or 0.3 parts to an upper limit of 1.5, 1.3, or 1.0 per 100 parts of a combination of the first polyether polyol, the second polyether polyol, and the third polyether polyol.

The semi-flexible foam formulations can include a catalyst. The catalyst can be an amine catalyst, a metallic catalyst, and combinations thereof. Examples of amine catalysts include pentamethyldiethylene-triamine, triethylamine, tributyl amine, dimethylethanolamine, N,N,N',N'-tetra-methylethylenediamine, dimethylbenzylamine, N,N,N',N'-tetramethylbutanediamine, dimethylcyclohexylamine, triethylenediamine, and combinations thereof, among others. Examples of metallic catalysts include tin(II) salts of organic carboxylic acids, e.g., tin(II) diacetate, tin(II) dioctanoate, tin(II) diethylhexanoate, Stannous Octoate and tin (II) dilaurate, and dialkyltin(IV) salts of organic carboxylic acids, e.g., dibutyltin diacetate, dibutyltin dilaurate, dibutyltin maleate and dioctyltin diacetate, and combinations thereof, among others. Catalysts are available commercially and include those available under trade names such as NIAX™, POLYCAT™, and DABCO™, among others. Some embodiments of the present disclosure provide that the catalyst can be a combination of at least one amine and a metal salt. Some embodiments of the present disclosure provide that reactive amine catalysts, such as DMEA or Dimethylethanolamine, and DMAPA or N,N-dimethylaminopropylamine and preferably an amine initiated polyol, such as Dow s VORACTIV™ or SPECFLEX ACTIV™ polyol, can be used to reduce or eliminate amine based VOC s or Volatile Organic Compounds, for example.

Some embodiments of the present disclosure provide that catalyst is from 0.04 parts to 5.00 parts per 100 parts of a combination of the first polyether polyol, the second polyether polyol, and the third polyether polyol. All individual values and subranges from 0.04 parts to 5.00 parts are included; for example, the catalyst can be from a lower limit of 0.04, 0.07, or 0.09 parts to an upper limit of 5.00, 3.50, or 2.00 parts per 100 parts of a combination of the first polyether polyol, the second polyether polyol, and the third polyether polyol.

Some embodiments of the present disclosure provide that the semi-flexible foam formulations can include one or more additional components. Different additional components and/or different amounts of the additional components may be utilized for various applications. Examples of additional components include liquid and/or solid pigments, colorants, flame retardants, crosslinkers, fillers, chain extenders, antioxidants, surface modifiers, bioretardant agents, mold release agents, and combinations thereof, among others. For a number of embodiments, no crosslinkers or chain extenders are utilized.

Semi-flexible foams disclosed herein can be prepared by curing, e.g. reacting, the semi-flexible foam formulations previously discussed. In contrast to previous semi-flexible foams, which have a high density and are usually made with a high functionality crosslinker, as discussed for instance in US 20130209778, or have closed cells, as described in WO 01/018087, for instance. Another option is to use a high primary OH polyol obtained by EO capping, as claimed in EP 932,633. Additionally as mentioned and in contrast to previous semi-flexible foams, the semi-flexible foams disclosed herein have a number of viscoelastic properties.

The semi-flexible foams disclosed herein can be prepared using known methods. These methods may include continuous or discontinuous free-rise slabstock foam processes and molded foam processes using a mixing head or a stirrer to blend components together with or without addition of air, for example. Output of the mixing head can be deposited onto a conveyor or to a mold. For slabstock process, the semi-flexible foam can expand further and rises as it moves down the conveyor, forming a continuous viscoelastic foam slab that can be cut into blocks or buns of a desired length for further curing and/or storage and subsequent slicing. In a discontinuous process, the semi-flexible foam formulation can be mixed through a head and poured into a container. A variable pressure foaming (VPF) process, as described in U.S. Pat. No. 5,194,453, can be utilized.

A molded foam process can employs a one-shot approach in which a specific amount of the isocyanate is combined and mixed with a specific amount of the remaining semi-flexible foam formulation components to form a mixture. The mixture can deposited as a froth into a mold that is then closed. The foam can expand to fill the mold, which is subsequently opened for demolding after a curing time. The curing time can be between 1 and 20 minutes, for example.

The semi-flexible foam can have an irregular cell size structure with open cells, e.g., with broken windows. Preferably the linear cell count is below 40 cells per centimeter. Very fine cells may provide a tight foam and may utilize a silicone surfactant adjustment, either using a different type or and changing concentration, for instance.

As mentioned, for some applications it is desirable for a semi-flexible foam to have a compression load deflection at 40% of at least 1.3 kilopascals as measured according to ISO 3386.

The semi-flexible foams disclosed herein can have a compression load deflection at 40% as measured according to ISO 3386, of at least 1.4 kPa.

The semi-flexible foams disclosed herein can have a density, measured according to ISO 845-88, from 35 $kg/m^3$ to 80 $kg/m^3$. All individual values and subranges from 35 $kg/m^3$ to 80 $kg/m^3$ are included; for example, the semi-rigidfoams can have a density from a lower limit of 35 $kg/m^3$, 37 $kg/m^3$, or 40 $kg/m^3$ to an upper limit of 80 $kg/m^3$, 75 $kg/m^3$, or 70 $kg/m^3$. Advantageously the semi-flexible foams disclosed herein may be utilized for low density applications. For example, for a number of applications, it is desirable for the density to be less than 90 $kg/m^3$.

The semi-flexible foams disclosed herein can have an uncrushed airflow, measured according to ASTM D 3574, from 0.01 $ft^3$/min to 10.00 $ft^3$/min. All individual values and subranges from 0.01 $ft^3$/min to 10.00 $ft^3$/min are included; for example, the semi-flexible foams can have an uncrushed airflow from a lower limit of 0.01 $ft^3$/min, 0.02 $ft^3$/min, or 0.03 $ft^3$/min to an upper limit of 10.00 $ft^3$/min, 9.00 $ft^3$/min, or 8.00 $ft^3$/min. As previously mentioned, the semi-flexible foams can include open cells, hence, for various applications, uncrushed airflow values above 0.05 $ft^3$/min are preferred.

The semi-flexible foams disclosed herein can have a resiliency, measured according to ASTM D 3574, from 2 percent to 20 percent. All individual values and subranges from 2 percent to 20 percent are included; for example, the semi-flexible foams can have a resiliency from a lower limit of 2 percent, or 3 percent to an upper limit of 20 percent, 18 percent, or 16 percent.

The semi-flexible foams disclosed herein can have a 95% foam recovery time, measured according to ASTM 3574/08 test M of at least 3 seconds. For example, semi-flexible foams disclosed herein can have a 95% foam recovery time, measured according to ASTM 3574/08 test M from 3 seconds to 200 seconds.

The semi-flexible foams disclosed herein can have a 90% dry compression, measured according to ISO 1856, below 5 percent and a 70% wet compression set, measured according to ISO 13362, below 5.0 percent. All individual values and subranges from 0.0 percent to 5.0 percent are included; for example, the semi-rigid foams can have a compression set from a lower limit of 0.0 percent, 0.1 percent, or 0.2 percent to an upper limit of 5.0 percent, 4.8 percent, or 4.5 percent.

A low value of compression set, e.g. a value below 5 percent, indicates that the semi-flexible foam recovers at least 95% of its initial thickness within a particular time limit. This indicates that the semi-rigid foam has a proper durability for use in bedding and furniture, although the recovery time is delayed The semi-flexible foams disclosed herein can have at least one glass transition temperature from 0° C. to 90° C. All individual values and subranges from 0° C. to 90° C. are included.

EXAMPLES

In the Examples, various terms and designations for materials are used including, for instance, the following:

Polyether polyol #1 (polyol with nominal hydroxyl functionality of 3 and a number average equivalent weight of 1180, 7% EO, available from The Dow Chemical Company); polyether polyol #2 (polyol with nominal hydroxyl functionality of 4.7 and a number average equivalent weight of 156, 0% EO, available from The Dow Chemical Company); polyether polyol #3 (polyol with nominal hydroxyl functionality of 3 and a number average equivalent weight of 336, 60% EO mixed feed with PO, available from The Dow Chemical Company); NIAX™ A1 (amine catalyst, available from Momentive Performance Materials Inc.); DABCO® 33LV (amine catalyst, available from Air Products & Chemicals Inc.); DABCO® T-9 (metallic catalyst, available from Air Products & Chemicals Inc.); NIAX™ L-620 (surfactant, available from Momentive Performance Materials Inc.); toluene diisocyanate 80-20 (80% 2,4-toluene diisocyanate and 20% 2,6-toluene diisocyanate, available from The Chemical Company).

Example 1, a semi-flexible foam formulation, was prepared at approximately 22° C. To prepare Example 1, based upon 270 grams of total polyether polyol, all components except the toluene diisocyanate were added to a container and stirred for 30 seconds, after which the toluene diisocyanate was added to the contents of the container, which were stirred for an additional 30 seconds with a bench scale static mixer at approximately 1,800 RPM. Relative amounts of the components of Example 1 are shown in Table 1. Examples 2-3 were prepared as Example 1, with any changes indicated in Table 1.

TABLE 1

|  | Example 1 | Example 2 | Example 3 |
| --- | --- | --- | --- |
| Polyether polyol #1 (parts) | 25 | 25 | 25 |
| Polyether polyol #2 (parts) | 20 | 20 | 20 |
| Polyether polyol #3 (parts) | 55 | 55 | 55 |
| Water (parts) | 2 | 2 | 2 |
| NIAX™ A1 catalyst (parts) | 0.15 | 0.15 | 0.15 |
| DABCO® 33LV catalyst (parts) | 0.05 | 0.05 | 0.05 |
| NIAX™ L-620 surfactant (parts) | 0.8 | 0.8 | 0.8 |
| DABCO® T-9 catalyst (parts) | 0.06 | 0.05 | 0.04 |
| Toluene diisocyanate (isocyanate index) | 82 | 86 | 90 |

Example 4, a semi-flexible foam, was formed by curing Example 1. To form Example 4, Example 1 was poured into an open top container and allowed to rise and cure for approximately 5 minutes at approximately 22° C., thereafter annealed in an oven for approximately 5 minutes at 150° C., and then removed from the oven and left uncovered for approximately 24 hours at approximately 22° C. in a ventilated area. Examples 5-6 were formed as Example 4, with the change that Examples 2-3 respectively replaced Example 1.

Various foam properties were determined for Examples 4-6. The properties were determined at 22° C. and 50 percent relative humidity.

Density was measured according to ISO 845-88; uncrushed airflow was measured according to ASTM D 3574, uncrushed means that foam samples were not compressed before airflow testing to leave the cell windows intact, as they were after foaming and curing; resiliency was measured according to ASTM D 3574; 90% dry compression set was measured according to ISO 1856-00; and wet compression set was measured according to ISO 13362. Results are reported in Table 2.

TABLE 2

| Semi-rigid foam | Density (kg/m$^3$) | Uncrushed airflow (ft$^3$/min) | Resiliency (%) | 90% dry compression set (%) | Wet compression set (%) |
| --- | --- | --- | --- | --- | --- |
| Example 4 | 44.2 | 3.7 | 3 | 0.5 | 0.0 |
| Example 5 | 44.4 | 2.4 | 4 | 0.1 | 0.0 |
| Example 6 | 44.6 | 2.1 | 6 | 0.2 | 0.0 |

The data of Table 2 indicates desirable foam properties for each of Examples 4-6, since the loss of thickness of the foam samples after accelerated aging is very low for each of these semi-flexible foams. Surprisingly, the desirable resistance to both dry and humid aging is obtained while resiliency is low. Additionally, as indicated by the data of Table 2, foam airflows are not negatively impacted by the use of a high polyol functionality. Such polyol combinations, with overall functionality above 3.0, may be expected to close foam cells though a fast viscosity buildup of the reactants during foaming.

Foam compression load deflection at 40% was measured according to ISO 3386. Foam recovery times were determined according to ASTM 3574/08 test M. A test sample with the dimensions 100×100×50 mm was placed in a perforated supporting plate, a circular indentation foot was brought into contact with a preload of 1 N to determine the specimen s initial thickness. The specimen was then compressed to 75% of its initial thickness. After a 60 seconds dwell time, the indentor returned to 5% deflection. Recovery time measurement begins as soon as the return movement of the indentor starts. Time recording stops as foam recovers to apply a 3 N load on the indentor foot. Foam compression load deflection at 40% and foam recovery times are reported in Table 3. Long recovery times are obtained with high airflow values indicating there is no pneumatic effect, hence these foams are truly viscoelastic. Foam compression sets are very low, confirming the good durability properties of foams formed from the semi-flexible foam formulations disclosed herein.

TABLE 3

| Semi-flexible foam | Compression load deflection at 40% as measured according to ISO 3386 (kPa) | 95% foam recovery time measured according to ASTM 3574/08 test M: (s) |
|---|---|---|
| Example 4 | 1.4 | 3 |
| Example 5 | 1.8 | 5 |
| Example 6 | 3.0 | 13 |

The data of Table 3 indicates that long recovery times are obtained with high airflow values indicating there is no pneumatic effect, hence these foams are truly viscoelastic. Foam compression sets are very low, confirming the good durability properties of foams formed from the semi-flexible foam formulations disclosed herein.

Glass transition temperatures were determined by dynamic mechanical thermal analysis (DMTA) utilizing Mettler Toledo DMA 861 equipment. Results are reported in Table 4.

TABLE 4

| Semi-flexible foam | Glass transition temperature (° C.) |
|---|---|
| Example 4 | 28 |
| Example 6 | 35 |

The data in Table 4 show that each of the Examples tested has a glass transition temperature above the freezing point of water, which may be desirable for a number of applications.

What is claimed is:

1. A semi-flexible foam formulation comprising:
polyether polyol composition comprising:
a first polyether polyol having an average nominal hydroxyl functionality from 2 to 4 and a number average equivalent weight from 120 to 1500, wherein the first polyether polyol includes a polymer chain having from 0 weight percent to 15 weight percent of constitutional units derived from ethylene oxide and 85 weight percent to 100 weight percent of constitutional units derived from propylene oxide;
a second polyether polyol having a having an average nominal hydroxyl functionality from 4.7 to 8 and a number average equivalent weight from 120 to 800, wherein the second polyether polyol includes a polypropylene oxide polymer chain having no ethylene oxide; and
a third polyether polyol having an average nominal hydroxyl functionality from 2 to 4 a number average equivalent weight from 200 to 500, wherein the third polyether polyol includes a polymer chain having from 30 weight percent to 85 weight percent of constitutional units derived from ethylene oxide and 15 weight percent to 60 weight percent of constitutional units derived from propylene oxide;
wherein the polyether polyol composition is from 20 weight percent to 50 weight percent of constitutional units derived from ethylene oxide, the polyether polyol composition has a total average nominal hydroxyl functionality from 3.05 to 4.1, and the polyether polyol composition has a total number average equivalent weight from 250 to 400; and
toluene diisocyanate.

2. The semi-flexible foam formulation of claim 1, wherein the first polyether polyol is from 10 parts to 60 parts per 100 parts of a combination of the first polyether polyol, the second polyether polyol, and the third polyether; the second polyether polyol is from 3 parts to 40 parts per 100 parts of the combination of the first polyether polyol, the second polyether polyol, and the third polyether polyol; and the third polyether polyol is from 30 parts to 70 parts per 100 parts of the combination of the first polyether polyol, the second polyether polyol, and the third polyether polyol.

3. The semi-flexible foam formulation of claim 1, wherein the first polyether polyol, and the third polyether polyol have a nominal functionality of 3 and the second polyether polyol has a nominal functionality of 4.7.

4. A semi-flexible foam formulation of claim 1, wherein the semi-flexible foam formulation has an isocyanate index in a range from 70 to 115.

5. The semi-flexible foam formulation of claim 1, further including a blowing agent that is from 0.5 parts to 5 parts per 100 parts of a combination of the first polyether polyol, the second polyether polyol, and the third polyether polyol.

6. The semi-flexible foam formulation of claim 1, further including a surfactant that is from 0.1 parts to 1.5 parts per 100 parts of a combination of the first polyether polyol, the second polyether polyol, and the third polyether polyol.

7. The semi-flexible foam formulation of claim 1, further including a catalyst selected from the group consisting of amine catalysts, metallic catalysts, and combinations thereof, wherein the catalyst is from 0.04 parts to 5.00 parts per 100 parts of a combination of the first polyether polyol, the second polyether polyol, and the third polyether polyol.

8. A method for forming a semi-flexible foam comprising:
combining a polyether polyol composition comprising:
a first polyether polyol having an average nominal hydroxyl functionality from 2 to 4 and a number average equivalent weight from 120 to 1500, wherein the first polyether polyol includes a polymer chain having from 0 weight percent to 15 weight percent of constitutional units derived from ethylene oxide and 85 weight percent to 100 weight percent of constitutional units derived from propylene oxide;
a second polyether polyol having a having an average nominal hydroxyl functionality from 4.7 to 8 and a number average equivalent weight from 120 to 800, wherein the second polyether polyol includes a polypropylene oxide polymer chain having no ethylene oxide; and a third polyether polyol having an average nominal hydroxyl functionality from 2 to 4 a number average equivalent weight from 200 to 500, wherein the third polyether polyol includes a polymer chain having from 30 weight percent to 85 weight percent of constitutional units derived from ethylene oxide and 15 weight percent to 60 weight percent of constitutional units derived from propylene oxide;

wherein the polyether polyol composition is from 20 weight percent to 50 weight percent of constitutional units derived from ethylene oxide, the polyether polyol composition has a total average nominal hydroxyl functionality from 3.05 to 4.1, and the polyether polyol composition has a total number average equivalent weight from 250 to 400; and toluene diisocyanate to form a semi-flexible foam formulation having an isocyanate index in a range from 70 to 115; and curing the semi-flexible foam formulation to form the semi-flexible foam.

9. The method of claim 8, wherein further comprising;

adding water to the semi-flexible foam formulation, wherein the water is from 0.5 parts to 3.5 parts per 100 parts of a combination of the first polyether polyol, the second polyether polyol, and the third polyether polyol; and adding a catalyst and a surfactant to the semi-flexible foam formulation, wherein the catalyst is from 0.05 parts to 5 parts per 100 parts of the combination of the first polyether polyol, the second polyether polyol, and the third polyether polyol and the surfactant is from 0.1 parts to 1.5 parts per 100 parts of the combination of the first polyether polyol, the second polyether polyol, and the third polyether polyol.

* * * * *